United States Patent [19]

Tsutsumi et al.

[11] Patent Number: 4,660,053

[45] Date of Patent: Apr. 21, 1987

[54] THERMAL TRANSFER RECORDING APPARATUS

[75] Inventors: Teruo Tsutsumi, Tama; Sadao Ikeda, Hachioji; Toshio Takagi, Hino, all of Japan

[73] Assignee: Kabushiki Kaisha Toshiba, Japan

[21] Appl. No.: 770,997

[22] Filed: Aug. 30, 1985

[30] Foreign Application Priority Data

Aug. 31, 1984 [JP] Japan ................................ 59-182939
Sep. 25, 1984 [JP] Japan ................................ 59-200282
Sep. 25, 1984 [JP] Japan ................................ 59-200288
Sep. 25, 1984 [JP] Japan ................................ 59-200289

[51] Int. Cl.[4] .............................................. G01D 15/10
[52] U.S. Cl. ................................ 346/76 PH; 346/105
[58] Field of Search .................. 346/76 PH, 136, 105; 358/304; 355/13; 400/593, 120

[56] References Cited

U.S. PATENT DOCUMENTS 4,442,460 4/1984 Kurata et al. ........................ 358/304
4,560,990 12/1985 Sue et al. ............................. 358/304

*Primary Examiner*—Arthur G. Evans
*Attorney, Agent, or Firm*—Finnegan, Henderson, Farabow, Garrett & Dunner

[57] ABSTRACT

In a thermal transfer recording method for use in a recording apparatus using a roll of recording paper of an ordinary paper material wound about a core and a strip of ink ribbon would about an ink ribbon feeding roll, recording is effected by means of a thermal head while both the recording paper and the ink ribbon are transported forwardly in the superimposed state. During transportation of the recording paper and the ink ribbon after the recording, they are parted away one from the other and only the recording paper is transported to an automatic cutter by means of which a part of the recording paper on which recording has been effected is cut off. After completion of cutting operation an unused parts of the recording paper and the ink ribbon are transported backwardly to the position where the leading end of the thus returned recording paper is located in the proximity of the thermal head.

14 Claims, 9 Drawing Figures

THERMAL TRANSFER RECORDING APPARATUS

BACKGROUND OF THE INVENTION

1. Field of the Invention

The present invention relates to a thermal transfer recording method. Further, the present invention relates also to an apparatus for carrying out the aforesaid method.

2. Description of the Prior Art

In the hitherto known facsimile apparatus, as means for receiving image data of an original and recording them, an electrostatic recording method and a thermal transfer recording method are mainly employed for the signal receiving and recording mechanism. The electrostatic recording method has an advantageous feature that recording can be effected at a high speed with high image resolvability, but it has drawbacks that the apparatus using this method is complicated and expensive because developing and fixing of images are required. In addition, recording paper used in this apparatus is expensive, resulting in comparatively increased running cost. On the other hand, the thermal transfer recording method has advantageous features that developing and fixing of images are not required because the image is built by primary coloring under the effect of heating and an apparatus using this method can be constructed in the comparatively simple manner, but it has drawbacks that recording papers are of specially produced type which have less durability and the images recorded thereon can be falsified relatively easily.

In view of the problem inherent to the recording methods as described above, there has been proposed a thermal transfer recording apparatus for a facsimile equipment in which inexpensive ordinary paper is employed as recording medium. The thermal transfer recording apparatus of this type is operated such that recording paper made of ordinary paper and ink ribbon serving as master recording material and comprising a base film made of paper, plastic or the like material with a layer of thermally fusible solid ink containing coloring agent coated thereon are superimposed one above another so that the ink layer comes in contact with the recording paper and they are transported in a certain direction while the base film is depressed by means of a platen roller so as to allow it to come in contact with heating resistor elements of a thermal head. When pulse electric current is selectively caused to flow through the heating resistor elements in response to signals representing an image to be recorded, heat is generated at the heating resistor elements. The generated heat is transmitted to the solid ink layer through the base film of ink ribbon. Thus, the solid ink layer becomes in a semi-fused state and viscous. The semi-fused ink is transferred to recording paper under the influence of pressure given by the platen roller whereby a permanent image is built on the paper.

Since this type of recording apparatus uses ordinary paper as recording medium and does not require processes of developing and fixing, running cost can be reduced considerably and can be manufactured in a simple construction, in smaller dimensions and at an inexpensive cost. Further, since coloring agents having excellent weather proofness are used for the ink which is transferred only onto a required area on the paper, the recording paper and the recorded images are durable for a longer time and falsification of the recorded image is difficult to make compared with the foregoing heat sensitive recording apparatus.

However, it has been pointed out that the existent thermal transfer recording apparatuses fail to satisfactorily meet a variety of requirements for receiving and recording image signals, when used in a facsimile apparatus.

For instance, when the thermal transfer recording apparatus of the above type is applied to a facsimile apparatus, recording paper having the size of A4 (29.7 cm×21 cm) or B4 (36.4 cm×25.7 cm) is used as recording medium and therefore the length of an original of which image signals can be completely sent and received is limited within the extent of the same length as that of the sheet of recording paper or shorter. Further, in the conventional thermal transfer recording apparatus, the ink ribbon and the recording paper correspond to each other in the one-to-one relation and that the length of ink ribbon is determined to have the length of the recording paper. Therefore, both the ink ribbon and the recording paper tend to have a blank area respectively which is not concerned with recording operation. This is not preferable from the view point of cost and process. Further, since the paper storage section for storing a pile of paper sheets requires a considerably large space, the thermal transfer recording apparatus using ordinary paper is more difficult to be used in a small facsimile apparatus designed to be placed on a desk than in the case of the hitherto known heat sensitive recording apparatus.

SUMMARY OF THE INVENTION

Hence, the present invention has been made with the foregoing background in mind and its object resides in providing an improved thermal transfer recording method which makes it possible to effect recording on a recording paper having any required length.

Another object of the present invention is to provide an apparatus for carrying out the aforesaid method effectively.

Still another object of the present invention is to provide improved thermal transfer recording method and apparatus which avoid useless consumption of recording paper and ink ribbon.

Further another object of the present invention is to provide improved thermal transfer recording method and apparatus which assure that the apparatus is designed and constructed in smaller dimensions.

To accomplish the above objects, there is proposed according to one aspect of the invention a thermal transfer recording method using a roll of recording paper of ordinary paper wound about a core and a strip of ink ribbon wound about an ink ribbon feeding roll, wherein the improvement consists in that the method is carried out by way of the steps of transporting recording paper unwound from the recording paper roll and ink ribbon unwound from the ink ribbon feeding roll, bringing the recording paper and ink ribbon being transported in contact with a thermal head of line scanning type while they are superposed one above another, selectively transferring ink of the ink ribbon onto the recording paper by actuating the thermal head, transporting the recording paper and the ink ribbon until the end of the recorded part of the paper reaches an auto cutter while separating the recording paper away from the ink ribbon, cutting the recording paper at the end of the recorded part, and transporting an unrecorded part of the recording paper and an unused part of the ink ribbon to the position where the leading end of the recording paper is located in the proximity of the thermal head while again superposing the recording paper over the ink ribbon.

Further, to carry out the aforesaid method there is proposed according to another aspect of the invention a thermal transfer recording apparatus of the type including a frame, wherein the improvement consists in that the apparatus essentially comprises a recording paper holder adapted to rotatably hold a roll of recording paper of ordinary paper wound about a core, a line scanning type thermal head, a platen roller for bringing both the recording paper and the ink ribbon in pressure contact with the thermal head, an automatic cutter for cutting a part of the recording paper, a recording paper guide for guiding the recording paper to the automatic cutter through the space as defined between the thermal head and the platen roller after it is unwound from the recording paper roll, ink ribbon holding means for holding the ink ribbon feeding roll and the ink ribbon winding roll both of which are adapted to wind the ink ribbon thereabout, and an ink ribbon guide for guiding the ink ribbon to the ink ribbon winding roll through the space as defined between the thermal head and the platen roller after it is unwound from the ink ribbon feeding roll.

Other objects, features and advantages of the present invention will become more clearly apparent from the following description which has been prepared in conjunction with the drawings.

DESCRIPTION OF THE PREFERRED EMBODIMENT

Now, the present invention will be described in a greater detail hereunder with reference to the accompanying drawings which schematically illustrate a preferred embodiment thereof.

Figure 1:
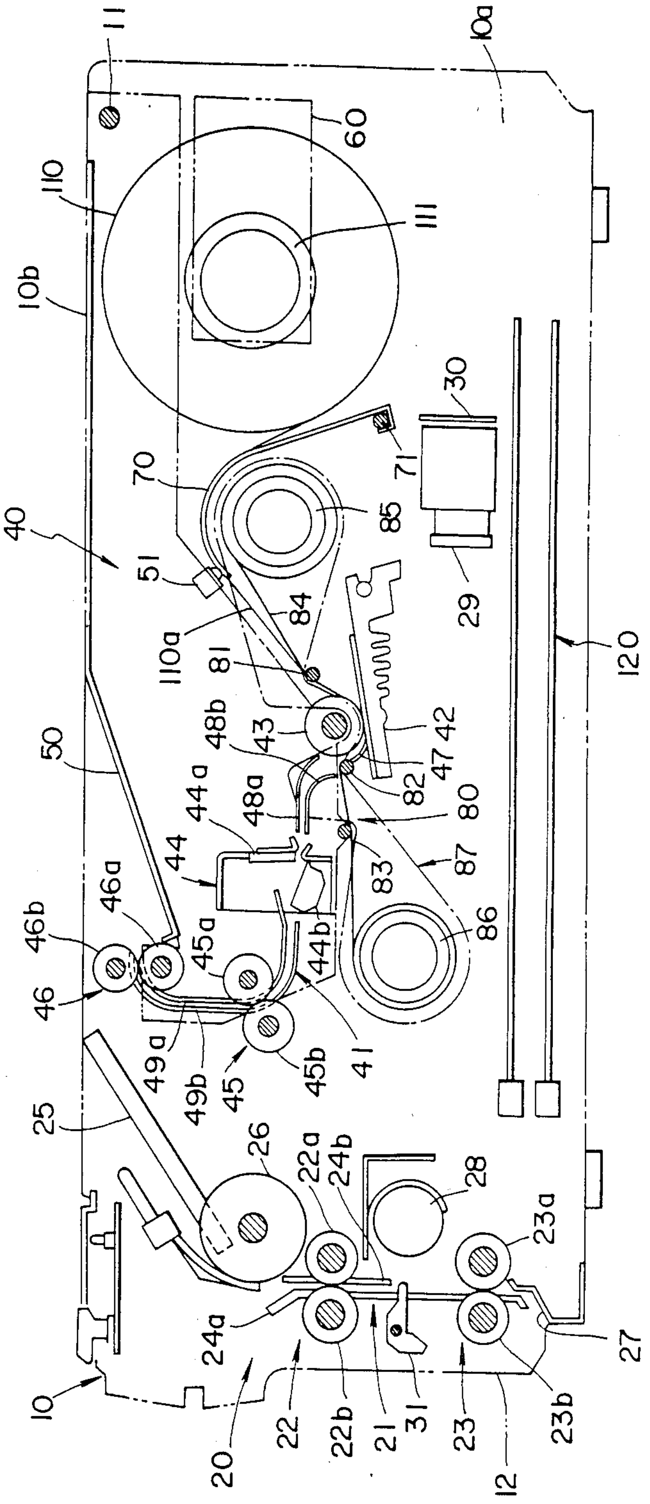
FIG. 1 is a vertical sectional view of a facsimile apparatus to which the thermal transfer recording method of the invention is applied.

A facsimile apparatus as illustrated in FIG. 1 which adopts thermal transfer recording in recording images on an origination includes a signal sending section and a signal receiving section both of which are housed in a common casing. As is apparent from the drawing, the frame of the facsimile apparatus is constituted by a casing frame 10*a* of which the upper end is opened to the outside and a cover frame 10*b* adapted to close the opened part of the casing frame 10*a* and the cover frame 10*b* is supported turntable about a shaft 11 on the casing frame 10*a*. In the illustrated facsimile apparatus an apparatus casing 10 is constructed by using press worked sheet material of which configuration is designed to fit the apparatus frame.

The facsimile apparatus includes a signal sending mechanism 20 at the lefthand end part of the casing 10 as seen in the drawing, whereas it includes a signal receiving mechanism 40 at the central part of the same. Further, it includes a circuit board 120 at the bottom part of the casing 10 so as to control operations of the driving sections and others for both the signal sending mechanism 20 and the signal receiving mechanism 40.

Specifically, the single sending mechanism 20 is constructed such that originals are conveyed one by one therethrough and informations concerning white part and black colored part or fluctuation on darkness on each of the originals are converted into electrical signals having voltage level which varies continuously.

As illustrated in the drawing, the signal sending mechanism 20 is formed with an original transportation passage 21 along the one side 12 (the lefthand side as seen in the drawing) of the casing 10. The original transportation passage 21 is constituted by transportation rollers 22 comprising a driving roller 22*a* and a pinch roller 22*b*, transportation rollers 23 comprising a driving roller 23*a* and a pinch roller 23*b* and guide plates 24*a* and 24*b* disposed between both the transportation rollers 22 and 23. The lower end of an original board 25 carried on the casing 10 is located just above the original transportation passage 21 and an automatic paper feeding roller 26 is disposed between the original board 25 and the original transportation passage 21. The bottom part of the casing 10 located below the original transportation passage 21 is formed with an original discharging port 27.

It should be added that the signal sending mechanism 20 is provided with a variety of elements for reading image data on each of originals. Namely, the aforesaid elements for reading image data comprise a light source 28 for lighting the scanning surface of an original (for instance, fluorescent tube), a lens 29 for building an image of the original with light beam reflected at the latter, a line type image sensor 30 (for instance, CCD image sensor) and an original detector 31. As is apparent from the drawing, the light source 28 is located at the position in the proximity of the original transportation passage 21 between both the transportation rollers 22 and 23, the lens 29 and the image sensor 30 are located above the circuit board 120 and the original detector 31 is projected in the original transportation passage 21 between both the transportation rollers 22 and 23.

Next, description will be made below as to how an original is transported through the signal sending section including the signal sending mechanism 20 and how image data is obtained from the original.

A number of originals placed on the original board 25 are fed toward the original transportation passage 21 one by one by actuating the automatic paper feeding roller 26. The thus delivered original is transported further by means of the transportation rollers 22. When the leading end of original reaches the original detector 31, the latter is caused to turn by means of the original and thereby the image sensor 30 initiates its operation after the original is displaced down further by a predetermined distance. Image data obtained from the original with the aid of light beam emitted from the light source 28 are collected on the image sensor 30 through the lens 29 to build an image and they are then converted into electrical signals which in turn are transmitted after they are subjected to required processing such as image modifying, coding, modulating or the like. The original of which image data have been read in that way is transported to the original discharge port 27 by actuating the transportation rollers 23 and it is then discharged out of the casing 10 through the original discharge port 27.

On the other hand, the signal receiving mechanism 40 is constructed such that electrical signals are received from the signal sending mechanism 20 and an image such as a figure, letter, numeral or the like on the original is correctly reproduced on a recording paper.

The signal receiving mechanism 40 includes a recording paper transportation passage 41. Specifically, the recording paper transportation passage 41 is constituted by a recording paper holder 60, a recording paper guide plate 70, a thermal head 42, a platen roller 43, an automatic cutter 44, transportation rollers 45 comprising a driving roller 45*a* and a pinch roller 45*b*, transportation rollers 46 comprising a driving roller 46*a* and a pinch roller 46*b*, a plurality of guide plates 47, 48*a*, 48*b*, 49*a* and 49*b* extended between the associated elements and a recording paper tray 50 disposed at the upper central part of the casing 10. Amount the elements as described above the recording paper holder 60, the thermal head 42 and the automatic cutter 44 are arranged in the central area of the casing 10 in the substantially horizontal direction, whereas the transportation rollers 45 and 46 and the recording paper tray 50 are arranged in the substantially vertical direction. Further, the recording paper transportation passage 41 is equipped with a detector 51 at the position located in the proximity of the recording paper guide plate 70.

The thermal head 42 is designed in the form of a line scanning type thermal head which has a lot of micro heating resistors arranged at a predetermined density (for instance, 8 pieces/mm) by the number (for instance, 2048 pieces in total) corresponding to the recording width (for instance, 256 mm in the case of B4 size). When they are turned on in response to image data to be recorded, an ink ribbon which comes in contact with the thermal head in such a manner as described later is locally heated up to melt a layer of solid ink whereby a visual image is built on a recording paper.

On the other hand, the platen roller 43 is constructed in the form of a roller made of rubber with a metallic shaft extended along the center axis thereof. As illustrated in the drawing, the platen roller 43 is located just above the group of heating resistors of the thermal head 42 while the ink ribbon and the recording paper are interposed therebetween in such a manner as described later. Thus, when the thermal head 42 is displaced in the upward direction as seen in FIG. 1 with the aid of actuating means which is not shown in the drawing, the ink ribbon and the recording paper are clamped between the platen roller 43 and the thermal head 42 under the effect of a predetermined intensity of force whereby recording is achieved in the optimum manner. As the platen roller 43 is rotated by means of a power transmission and speed reduction mechanism including rotational force source and power transmission means such as stepping motor and gears or timing belt each of which is not shown in the drawing, both the ink ribbon and the recording paper are transported at a certain recording speed while they are kept in the superimposed state.

Further, the automatic cutter 44 is constructed by a combination of stationary blade 44*a* and movable blade 44*b*. The movable blade 44*b* is operatively associated with rotational power source such as motor, rotary solenoid or the like which is not shown in the drawing so that the recording paper is cut to a size corresponding to that of the original by actuating the aforesaid rotational power source.

The transportation rollers 45 including driving roller 45*a* and pinch roller 45*b* and the transportation rollers 46 including driving roller 46*a* and pinch roller 46*b* are adapted to transport recording paper toward the recording paper tray 50 by rotating the driving rollers 45*a* and 45*b* which are actuated by means of speed reduction mechanism including rotational power source and power transmission means such as stepping motor and timing belt which are not shown in the drawing, while recorded paper is clamped between the driving and pinch rollers.

Next, the guide plate 47 is made of resilient material such as leaf spring or the like. Its one end is fixedly secured to a guide bar 82 and its free end is brought in pressure contact with the thermal head 42. Accordingly, the guide plate 47 is disposed in the substantially same arch-shaped configuration as the circular configuration of the platen roller 43 in the coaxial relation relative to the latter whereby the recording paper transportation passage 41 is formed in the smoothly curved contour in the area extending between the thermal head 42 and the guide bar 82.

The detector 51 is constructed in the form of microswitch, photocoupler or the like means so as to detect whether recording paper is existent or not. When the tail end of recording paper moves past the detector 51, an electrical signal is generated so that the fact that no recording paper is existent can be informed to an operator with the use of electronic circuit and display means which are not shown in the drawing.

Figure 2:
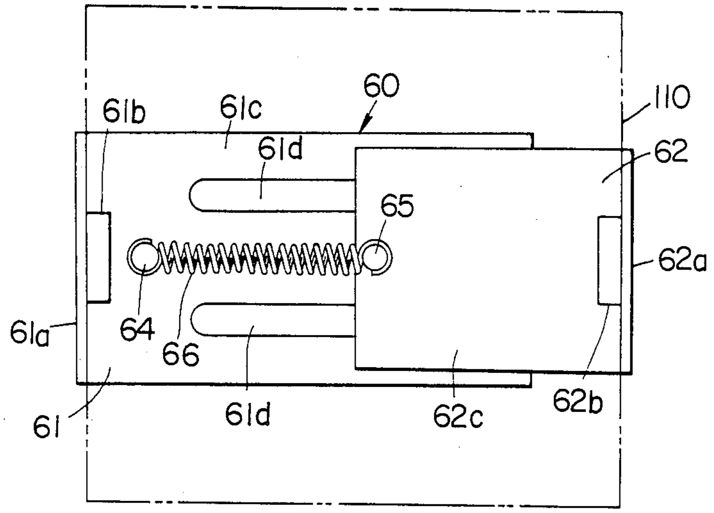
FIG. 2 is a front view of a recording paper holder for the thermal transfer recording apparatus in the facsimile apparatus in FIG. 1.
Figure 3:
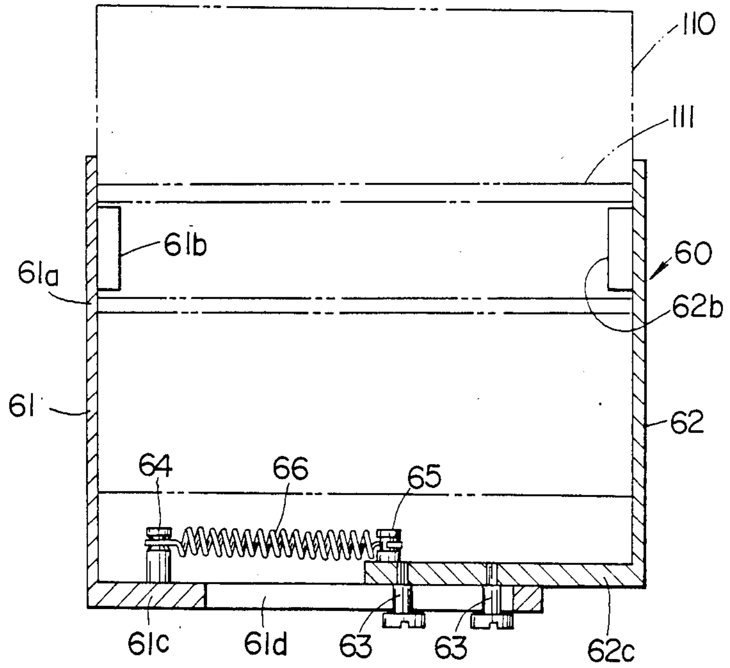
FIG. 3 is a vertical sectional view of the recording paper holder in FIG. 2.

As illustrated in FIGS. 2 and 3, the recording paper holder 60 is constituted by a combination of stationary spool 61 fixedly attached to the casing frame 10*a* and movable spool 62 disposed movable relative to the stationary spool 61. The side plate 61*a* of the stationary spool 61 has a projection 61*b* and the base plate 61*c* is formed with an elongated hole 61*d*. On the other hand, the side plate 62*a* of the movable spool 62 has also a projection 62*b*. The movable spool 62 has a base plate 62*c* from which a pin 63 is projected downwardly. The pin 63 is fitted into the elongated hole 61*d* of the stationary spool 61. As will be best seen from FIG. 3, spring anchoring pins 64 and 65 stand upright on the base plate 61*c* of the stationary spool 61 and the base plate 62*c* of the movable spool 62 so that a tension coil spring 66 is spanned between both the spring anchoring pins 64 and 65.

Since the recording paper holder 60 is constructed in the above-described manner, the movable spool 62 is normally biased toward the stationary spool 62 under the effect of resilient force of the coil spring 66.

Figure 4:
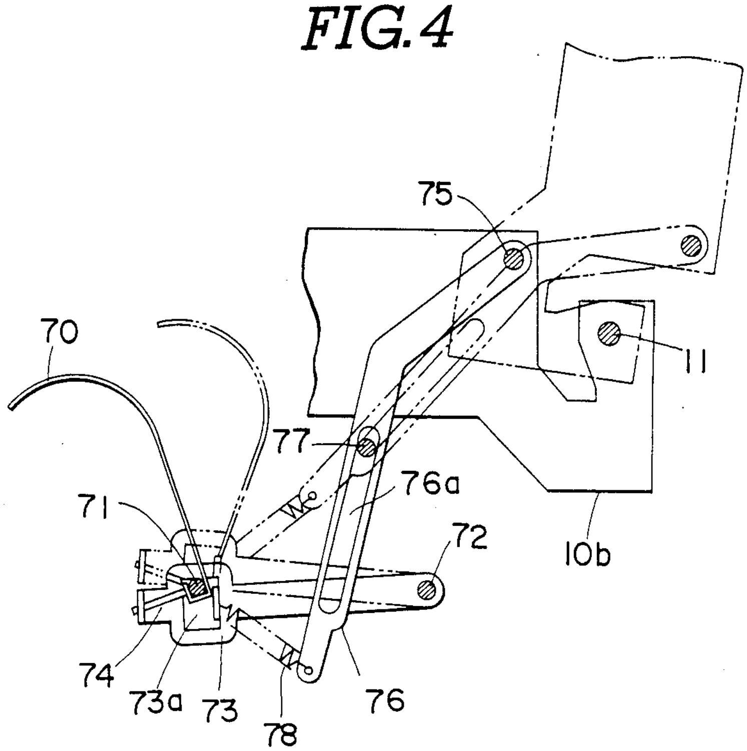
FIG. 4 is a side view of the actuating mechanism for a recording paper guide plate in the facsimile apparatus.

As illustrated in FIG. 4, the recording paper guide plate 70 is made of thin plate and its upper end part as seen in the drawing is designed in the arch-shaped configuration. The other end part of the recording paper guide plate 70 is fixedly secured to a shaft 71 which in turn is turnably supported on frames 13 and 14 constituting a part of the casing frame 10*a* (see FIG. 5). Further, at least one of the frames 13 and 14 is provided with a support shaft 72 (see FIG. 4) so that the right-hand end part of the lever 73 as seen in the drawing is swingably supported on the shaft 72. The free end part of the lever 73 is formed with a rectangular opening 73*a* so that the shaft 71 is fitted into the latter. It should be noted that a pin 74 on the shaft 71 is engaged to the free end part of the lever 73 at its foremost end. A lever 76 is supported turntable about a support shaft 10*b* on the cover frame 75 of the casing 10 (see FIG. 4). The lever 76 is formed with an elongated hole 76*a* in the middle area thereof so that a shaft 77 extending from at least one of the frames 13 and 14 is inserted through the elongated hole 76*a*. The free end of the lever 76 is operatively connected to the lever 73 via a tension spring 78.

Thus, while the cover frame 10*b* is held in the closed state as represented by real lines in FIG. 4, the lever 73 is biased downwardly under the effect of resilient force of the tension spring 78 whereby it causes the shaft 71 to turn in the anticlockwise direction as seen in FIG. 4 with the aid of the pin 74. However, the extent of turn movement of the lever 73 is limited by means of the shaft 71. As a result, the recording paper guide plate 70 is kept in the state as illustrated by real lines in the drawing. Next, when the cover frame 10*b* is opened, that is, it is turned to the position as identified by phantom lines in FIG. 4, the lever 76 is raised up by turning movement of the cover frame 10*b* whereby it causes the lever 73 to move upwardly under the effect of resilient force of the tension spring 78. In response to upward movement of the lever 73 in that way the shaft 71 is caused to turn in the clockwise direction as seen in FIG. 4 together with the pin 74 and thereby the recording paper guide plate 70 is turned in the clockwise direction. Since the extent of turning movement of the lever 73 is limited by means of the shaft 71, it results that the recording paper guide plate 70 stops its turning movement at the position as identified by phantom lines where it is held in the immovable state.

It should be noted that among the above-described elements constituting the apparatus the platen roller 43, the automatic cutter 44, the guide plates 48*a*, 48*b*, 49*a* and 49*b*, a guide bar to be described later, the driving rollers 45*a* and 46*a*, the detector 51 and rotational power source and power transmission mechanism for the platen roller 43 and the driving rollers 45*a* and 46*a* are mounted on the cover frame 10*b* as illustrated in FIG. 1.

Further, the signal receiving mechanism 40 includes also an ink ribbon transportation passage 80 (see FIG. 1). Specifically, the ink ribbon transportation passage 80 is constituted by guide bars 81 and 82 extended between both the frames 13 and 14 in the casing 10 (see FIG. 5) and a guide bar 83 mounted in the cover frame 10*b*. Now, a strip of ink ribbon 84 is ready to be conveyed through the space as defined between the thermal head 42 and the platen roller 43 via the guide bars 81, 82 and 83.

As is well known, the ink ribbon 84 serves as master material during the whole process of thermal transfer type recording and it is produced in the layered structure comprising a very thin base film made of, for instance, polyethylene terephthalate having a thickness of about 6 microns and a layer of solid ink adapted to melt by quick heating of the thermal heads. It has a width of W' which is determined same as the maximum with W of recording paper usable in the apparatus (for instance, 270 mm) or wider than the same. Further, it has a total length L' which is determined appreciably longer than the total length L of recording paper. A part of recording paper is wound about the ink ribbon feeding roll 85 and other part of the same is wound about the ink ribbon take-up roll 86. They are assembled in a cassette 87 and the ink ribbon feeding roll 85 and the ink ribbon take-up roll 86 are rotatably mounted on the side plates 88 and 89 (see FIG. 5). As is apparent from FIG. 1, the cassette 87 is fitted to the casing in the area located downwardly of the recording paper transportation passage 1.

Figure 5:
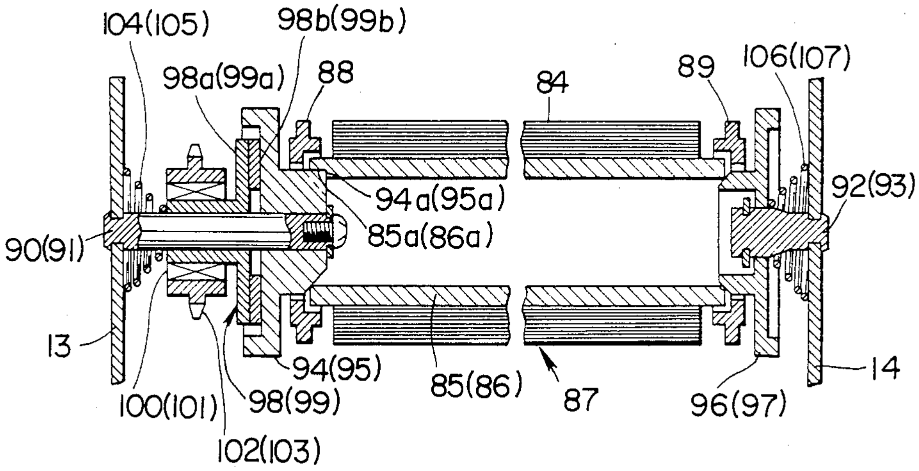
FIG. 5 is a vertical sectional view of the power transmission mechanism for ink ribbon holding means.

Next, FIG. 5 illustrates by way of a sectional view how the cassette 87 is held on both the frames 13 and 14 in the casing 10. The frames 13 and 14 have shafts 90, 91, 92 and 93 fixedly secured thereto and reels 94, 95, 96 and 97 are loosely fitted to the shafts 90, 91, 92 and 93. Among the above-described reels the reels 94 and 95 have at least one projection 94*a*, 95*a* at the inner end respectively. The projections 94*a* and 95*a* are adapted to come in engagement to grooves 85*a* and 86*a* on the end face of each of the ink ribbon feeding roll 85 and the ink ribbon take-up roll 86 so that the ink ribbon feeding roll 85 and the ink ribbon take-up roll 86 are operatively connected to the reels 94 and 95. Further, joint members 98 and 99 are slidably mounted on the shafts 90 and 91 extending between the frame 13 and the reels 90 and 91. The joint members 98 and 99 include circular discs 98*a* and 99*a* at the right end thereof as seen in the drawing and friction plates 98*b* and 99*b* are adhesively attached to the circular discs 98*a* and 99*a*. Sprockets 102 and 103 are mounted on the joint members 98 and 99 with one-way clutches 100 and 101 interposed therebetween. The joint members 98 and 99 are normally biased in the rightward direction as seen in FIG. 5 under the effect of resilient force of compression springs 104 and 105 disposed between the frames and the joint members 98 and 99. As a result, the reels 94 and 95 are brought in pressure contact with the ink ribbon feeding roll 85 and the ink ribbon take-up roll 86 via the friction plates 98*b* and 99*b*. On the other hand, the reels 96 and 97 are normally biased in the leftward direction as seen in FIG. 5 under the effect of resilient force of compression springs 106 and 107 whereby the end surfaces of the reels 96 and 97 are brought in pressure contact with the end surfaces of the ink ribbon feeding roll 85 and the ink ribbon take-up roll 86.

Incidentally, removal of the ribbon cassette 87 from the frame 13 and 14 in the casing 10 is achieved, for instance, by way of the steps of displacing the ink ribbon cassette 87 in the rightward direction as seen in FIG. 5, pushing the reels 96 and 97 against resilient force of the coil springs and then disengaging the reels 94 and 95 from the ink ribbon feeding roll 85 and the ink ribbon take-up roll 86.

On the contrary, when the ink ribbon cassette 87 is fitted to the frames 13 and 14 in the casing 10, fitting of the same is achieved by way of the steps of pushing the reels 96 and 97 against resilient force of the coil springs with the use of the ink ribbon cassette 87 itself, engaging the end part of the ink ribbon feeding roll 85 and the ink ribbon take-up roll 86 to the reels 96 and 97 and then engaging the other end part of the ink ribbon feeding roll 85 and the ink ribbon winding roll 86 to the reels 94 and 95.

Figure 6A:
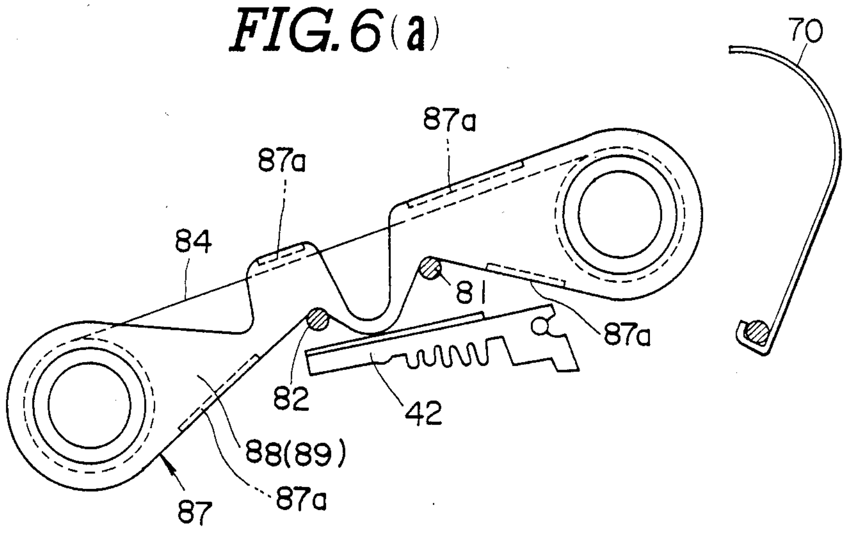
FIGS. 6(*a*) and 6(*b*) are a side view of an ink ribbon cassette respectively, particularly illustrating the operational positions of an ink ribbon.
Figure 6B:
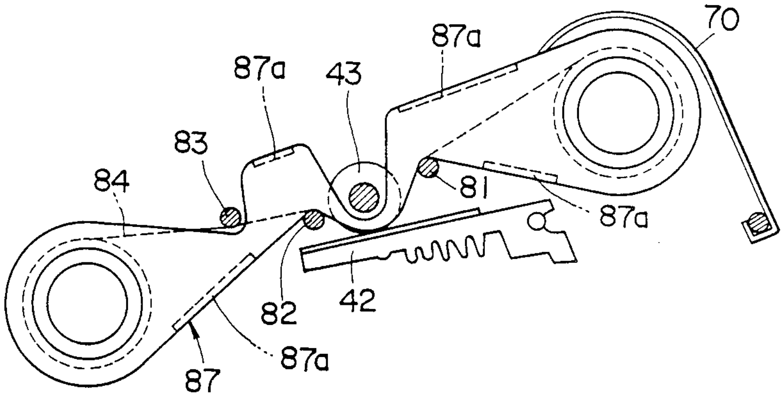

As illustrated in FIG. 6(*a*), when the ink ribbon cassette 87 is fitted to the casing 10, its side plates 88 and 98 are located by means of the guide bars 81 and 82. Thereafter, by closing the cover frame 10*b* it results that the ink ribbon 84 is clamped between the platen roller 43 and the thermal head 42 as illustrated in FIG. 6(*b*), while it is tensioned by means of the guide bar 83.

Figure 7:
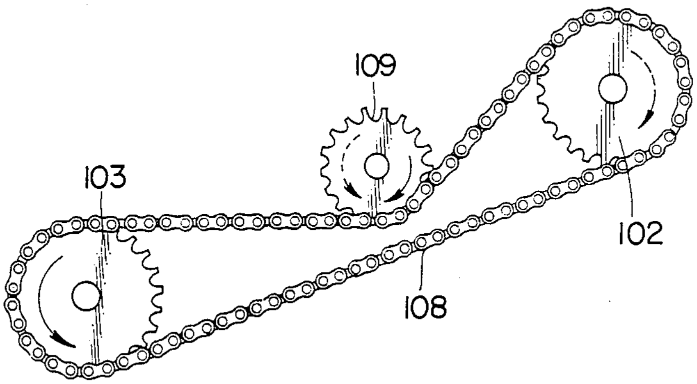
FIG. 7 is a side view of an ink ribbon driving mechanism in the facsimile apparatus.

To assure that the ink ribbon 84 and the recording paper are displaced in the completely synchronized state during the process of recording, the ink ribbon feeding roll 85 and the ink ribbon take-up roll 86 are rotated, for instance, by actuating the driving mechanism as illustrated in FIG. 7. In the drawing reference numeral 108 designates an endless roller chain comprising a number of links, bushes and pins. The roller chain 108 is endlessly extended around the sprockets 102 and 103 of the ink ribbon feeding roll 85 and the ink ribbon take-up roll 86, as illustrated in the drawing. The sprockets 102 and 103 are rotated as the roller chain 108 is driven by means of a sprocket 109 which is operatively connected to the platen roller 43 in the coaxial relation.

Specifically, when the sprocket 109 is rotated in the direction as identified by an arrow mark scribed with real lines in FIG. 7 as the platen roller 43 is rotated, the sprocket 103 located in the area of the ink ribbon take-up roll 86 is rotated in the direction as identified by an arrow mark scribed with real lines. Once the sprocket 103 has been rotated in the direction as described above, the one-way clutch 101 is kept in the locked state whereby rotational power of the sprocket 103 is transmitted to the reel 95 via the joint member 99. Thus, the ink ribbon take-up roll 86 is rotated in the same direction as that of the sprocket 103. On the other hand, the sprocket 102 located in the area of the ink ribbon feeding roll 85 is rotated in the direction reverse to that as identified by an arrow mark scribed with dotted lines. Once the sprocket 102 is rotated in the direction as described above, the one-way clutch 100 is shifted to the freely rotatable state so that rotational power of the sprocket 102 is not transmitted to the joint member 98. In this case rotational power of the platen roller 43 is transmitted only to the ink ribbon take-up roll 86 whereby only the ink ribbon take-up roll 86 is rotated. Thus, the ink ribbon feeding roll 85 is caused to rotate as a follower roll with the aid of the ink ribbon 84. At this moment the ink ribbon feeding roll 85 is affected by frictional force via the reel 94 which is caused by means of the friction plate 98*b* of the joint member 98. As a result, it is assured that the ink ribbon 84 is stretched with a properly determined intensity of tension force.

Referring to FIG. 7 again, when the sprocket 109 is rotated in the direction as identified by an arrow mark scribed with dotted lines as the platen roller 43 is rotated (in the reverse direction), the sprocket 102 located in the area of the ink ribbon feeding roll 85 is caused to rotate in the direction as identified by an arrow mark scribed with dotted lines. Once the sprocket 102 has been rotated in the direction as described above, the one-way clutch 100 is kept in the locked state whereby rotational power of the sprocket 102 is transmitted to the reel 94 via the joint member 98. Thus, the ink ribbon feeding roll 85 is rotated in the same direction as that of the sprocket 102. On the other hand, the sprocket 103 is rotated in the direction reverse to that as identified by an arrow mark scribed with real lines. Once the sprocket 103 has been rotated in the direction as described above, the one-way clutch 101 is shifted to the freely rotatable state so that rotational power of the sprocket 103 is not transmitted to the joint member 99. Accordingly, in this case rotational power of the platen roller 43 is transmitted only to the ink ribbon feeding roll 85 whereby only the ink ribbon feeding roll 85 is rotated. As a result, the ink ribbon take-up roll 86 is caused to rotate as a follower roll with the aid of the ink ribbon 84. At this moment the ink ribbon take-up roll 86 is affected by frictional force via the reel 95 which is caused by means of the frictional plate 99*b* of the joint member 99. As a result, it is assured that ink ribbon 84 is stretched with a properly determined intensity of tension.

It should be added that an inequality $Z_1/Z_2 \geqq d_2/d_1$ is established between the number of teeth $Z_1$ of the sprocket 109 and the number of teeth $Z_2$ of the sprockets 102 and 103, when it is assumed that $d_1$ designates a diameter of the platen roller 43 and $d_2$ does an outer diameter of the core of the ink ribbon feeding roll 85 and the ink ribbon take-up roll 86. This is intended to assure that the winding and unwinding speed of the ink ribbon 84 is normally determined higher than the driving speed given by the platen roller 43 and thereby slippage takes place with the friction plates 98*b* and 99*b* in the junction mechanism as illustrated in FIG. 5 whereby winding and unwinding operations of the ink ribbon 84 are performed while the latter is properly stretched at all time.

Figure 8:
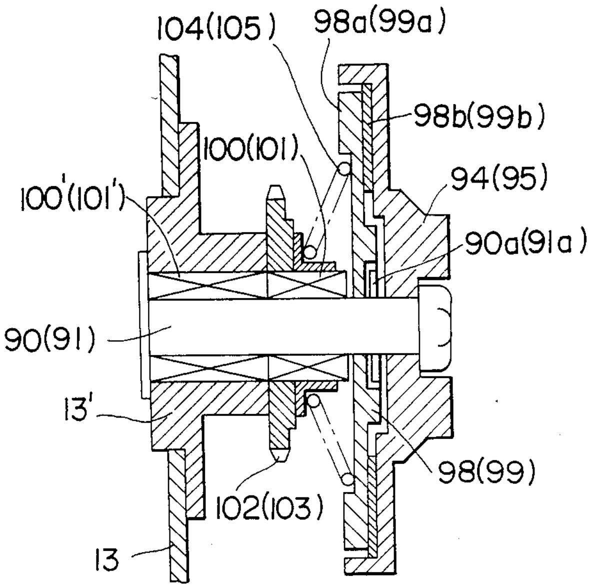
FIG. 8 is a vertical sectional view of the power transmission mechanism for ink ribbon holding means in accordance with another embodiment of the present invention.

Next, the power transmission mechanism for the ink ribbon feeding roll 85 (and the ink ribbon take-up roll 86) as illustrated in FIG. 5 may be constructed in such a modified manner as illustrated in FIG. 8. In the modified power transmission mechanism shafts 90 and 91 are supported on the frame 13 with one-way clutch 100′ and 101′ interposed therebetween and moreover sprockets 102 and 103 are supported on the shafts 90 and 91 with one-way clutches 100 and 101 interposed therebetween. Further, in the modified power transmission mechanism joint members 98 an 99 are mounted on the shafts 90 and 91 in such a manner as not to rotate thereon but slidably move in the axial direction by utilizing pins 90*a* and 91*a* or the like means. As is apparent from the drawing, the joint members 98 and 99 are normally biased in the rightward direction as seen in the drawing under the effect of resilient force of compression coil springs 104 and 105 so that they come in pressure contact with the reels 94 and 95 with friction plates 98*b* and 99*b* interposed therebetween.

In the case where the power transmission mechanism as constructed in the above-described manner is employed, when the one-way clutch 100 is held in the freely rotatable state, that is, the sprocket 102 is ready to rotate freely relative to the shaft 90, the reel 94 rotates as a follower roll as the ink ribbon is fed. At this moment, however, the joint member 98 can not be rotated because it is kept in the locked state by means of the one-way clutch 100′. Thus braking force is exerted on the reel 94. This is applicable in the same manner with the reel 95 located in the area of the ink ribbon take-up roll 86.

The cassette 87 including the ink ribbon feeding roll 85, the ink ribbon take-up roll 86 and the ink ribbon 84 is located in such a manner as illustrated in FIG. 1 so that the ink ribbon 84 is interposed between the thermal head 42 and the platen roller 43 and it runs while it comes in contact with the guide bars 81, 82 and 83.

Incidentally, a roll of recording paper 110 is such that a strip of plain paper having the width W (for instance, 257 mm) and the length L (for instance, 100 m) is wound about a core 111 in the form of a roll. The recording paper roll 110 is held on the recording paper holder 60 by fitting the core 111 onto the projections 61*b* and 62*b* thereof. The leading end 110*a* of the recording paper roll 110 is drawn into the space as defined between the thermal head 42 and the platen roller 43 via the recording paper guide plate 70 and the guide bar 81 so that it assumes the position located behind the group of micro heating resistors on the thermal head 42 by a distance of several millimeters.

When the cover frame 10*b* is opened away from the casing frame 10*a* of the facsimile apparatus with the signal receiving mechanism 40 incorporated therein, the platen roller 43, the automatic cutter 44, the guide plates 48*a*, 48*b*, 49*a* and 49*b* and the guide bar 83 are displaced upwardly together with the cover frame 10*b* and at the same time the recording paper guide plate 70 is caused to turn. As a result, the recording paper holder 60 and the empty space for receiving the ink ribbon cassette 87 therein are exposed to the outside. Now, the ink ribbon cassette 87 and the roll-shaped recording paper 110 are ready to be fitted into the casing frame 10*a*. Thereafter, when the cover frame 10*b* is closed, the platen roller 43, the automatic cutter 44, the guide plates 48*a*, 48*b*, 49*a* and 49*b* and the guide bar 83 are restored to their original position and at the same time the recording paper guide plate 70 resumes its original state.

The signal receiving section including the signal receiving mechanism 40 in the above-described manner is operated in such a manner that the recording paper 110*a* and the ink ribbon 84 are transported together to effect recording, as described below.

First, fascimile signals received via the electronic circuit are converted to image signals by way of the step of electrical processing such as modulating, coding, amplifying or the like and the thus converted signals are then transmitted to the thermal head 42 in FIG. 1. Thermal transfer type recording is carried out in accordance with the hitherto known principle of thermal transfer type recording by way of the steps of melting a layer of solid ink on the ink ribbon 84 in response to the recorded pattern and transferring molten ink onto the recording paper 110*a* with the aid of the platen roller 43 which serves to bring the ink ribbon 84 into the tight contact with the recording paper 110*a*. While both the printing paper 110*a* and the ink ribbon 84 are kept in the closely contacted state, they are transported in response to scanned lione without any occurrence of positional offset by rotating the platen roller 43 whereby recording is effected successively. Since arrangement is made such that only the ink ribbon 84 is caused to turn downwardly at the guide bar 82 after completion of recording, the recording paper 110*a* which has been brought in close contact with the ink ribbon 84 moves forward with the aid of its rigidity. As a result, the recording paper 110*a* is parted away from the ink ribbon 84. The thus separated paper 110*a* is transported further via the guide plates 48*a* and 48*b*, the automatic cutter 44 and the guide plates 49*a* and 49*b* by rotating the driving rollers 45*a* and 46*a* and the pinch rollers 45*b* and 46*b* in synchronization with rotation of the platen roller 43. Specifically, on completion of recording corresponding to the length of a single page of original of which image signals have been transmitted to the signal receiving mechanism 40 in that way, the platen roller 43, the driving rollers 45*a* and 46*a* and the pinch rollers 45*b* and 46*b* are rotated and thereby the recording paper 110*a* and the ink ribbon 84 are transported until the tail end of the recording paper 110*a* on which recording has been effected by a distance corresponding to the length of a single original reaches the cutting position on the automatic cutter 44 where the movable blade 44*b* comes in engagement to the stationary blade 44*a* to cut the recording paper 110*a*. Next, by actuating the rotational power source such as motor, rotary solenoid or the like the movable blade 44*b* on the automatic cutter 44 is displaced upwardly and thereby the recording paper 110*a* is cut to the substantially same length as that of the original. The thus cut recording paper 110*a* is transported further by rotational cooperation of the driving rollers 45*a* and 46*a* with the pinch rollers 45*b* and 46*b* until it is discharged from the apparatus. Thus, cut recording papers are stored on the recording paper tray 50 on above another in the layered structure. It should be noted that during recording operation and after completion of recording operation the ink ribbon 84 is normally stretched and it is then wound about the ink ribbon take-up roll 86 without occurrence of loosening in such a manner as described above with respect to the junction mechanism for the ink ribbon take-up roll as well as the driving mechanism with reference to FIGS. 5 and 6.

On the other hand, at the same time when further transportation of a cut recording paper is initiated, the platen roller 43 as illustrated in FIG. 1 is rotated in the reverse direction by reversing the order of excitation of magnetic phases in the stepping motor which serves as driving source for the platen roller 43.

Further, rotational power is transmitted from the platen roller 43 to the ink ribbon feeding roll 85 via the one-way clutch 100 as illustrated in FIG. 5 and the ink ribbon driving mechanism as illustrated in FIG. 7 in which the sprocket 109 mounted on the platen roller 43 serves as rotational power source. Thus, the ink ribbon feeding roll 85 is rotated in the reverse direction. This causes the unrecorded part of the recording paper 110*a* and the ink ribbon 84 to move backwardly and moreover the recording paper 110*a* and the ink ribbon 84 which have been separated away from one another are caused to come in close contact with one another by means of the guide bar 82. When the leading end of the recording paper 110*a* moves back to the position located in front of the group of micro heating resistors on the thermal head at a distance of several millimeters as measured therefrom, the stepping motor which is not shown in the drawing stops its rotation and thereby both the recording paper 110*a* and the ink ribbon 84 are stopped. Now, the apparatus is ready to start next separations of receiving of facsimile signals and recording of the latter.

As facsimile signals are successively received, the roll-shaped recording paper 110 is increasingly consumed. When it it is fully consumed, its tail end is parted away from the core 111 and passes by the recording paper detector 51. In response to detection of the tail end of the recording paper 110 the recording paper detector 51 generates an electrical signal which is transmitted to electronic circuitry and indicating means which are not shown in the drawing so that the fact that no recording paper is existent is informed to an operator in charge of the fascimile apparatus. As described above, the length of the ink ribbon 84 is set the same to that of the recording paper or appreciably longer than the latter in such a manner than an inequality $L \leqq L'$ is established for the whole length L' of ink ribbon and the whole length L of recording paper. This means that a length of unused part of ink ribbon is very short. For the reason there is necessity for opening the frame 10*b* to replace the used ink ribbon with new one. Namely, the ink ribbon cassette 87 including the used ink ribbon, the feeding roll and the winding roll therein is removed from the reels 94, 95, 96 and 97 as illustrated in FIG. 5 and thereafter a new ink ribbon cassette 87 including a feeding roll 85 with a large part of unused ink ribbon would thereabout and a winding roll 86 with a very short length of unused ink ribbon at the leading end thereof partially wound thereabout is fitted in the reverse order of handling operations. Further, the used core 111 is removed from the recording paper holder 60 and a new roll-shaped recording paper 110 is loaded on the recording paper holder 60. After the leading end part of new recording paper is inserted into the space as defined between the guide plates 48*a* and 48*b*, the cover frame 10*b* is closed. Now, the apparatus is ready to start next facsimile operation.

It should be noted that the facsimile apparatus of the invention may be employed for the case where heat sensitive type recording is effected. In this case a roll-shaped heat sensitive recording paper is loaded on the recording paper holder 60 and the ink ribbon cassette 87 is removed from the casing of the apparatus. Function of the heat sensitive recording paper is substantially same as that of the aforesaid recording paper 110*a*. Specifically, after recording is effected by means of the thermal head 42, the leading end part of the heat sensitive recording paper is displaced away from the thermal head 42 by rotating the platen roller 43 while it is clamped between the thermal head 42 and the platen roller 43. Further, it is transported along the guide plate 47 by means of the platen roller 43 and it is then transported further by means of the transportation rollers 45 and 46 which rotate in synchronization with rotation of the platen roller 43 via the guide plates 48*a* and 48*b*, the automatic cutter 44 and the guide plates 49*a* and 49*b*. On completion of recording on the heat sensitive recording paper by a distance corresponding to a single page, it is transported at a higher speed and when the tail end of the recorded part of heat sensitive recording paper reaches the automatic cutter 44, it is cut off from the main body of heat sensitive recording paper. Immediately after completion of cutting operation the platen roller 43 is rotated in the reverse direction until the leading end of unrecorded heat sensitive recording paper assumes the position located in front of the group of micro heating resistors on the thermal head 42 by a distance of several millimeters as measured from the latter. A sheet of recorded heat sensitive recording paper is transported further along the guide plates 49*a* and 49*b* by means of the transportation rollers 45 and 46 in the quitely same manner as in the foregoing case where recording is effected on thermal transfer recording paper until it is stored on the recording paper tray 50.

As will be readily apparent from the above description, the guide plate 47 is required to guide the leading end of heat sensitive recording paper, when recording is effected on heat sensitive recording paper. On the other hand, however, in the case where recording is effected on thermal transfer recording paper and the ink ribbon 84 functions in the same manner as the guide plate 47, the latter is not always required.

While the present invention has been described above with respect to the embodiments where it is applied to a facsimile apparatus including a signal receiving mechanism which serves as recording apparatus, it should of course be understood that it should not be limited only to this but it may be applied to a general type of recording apparatus such as printer or the like means.

What is claimed is:

1. A thermal transfer recording apparatus, comprising:

frame means for supporting the thermal transfer recording apparatus, said frame means including a casing frame having an opening along an upper part thereof and a cover frame mounted on said upper part for openably covering said opening of said casing frame;

a thermal head mounted on said casing frame;

a recording paper holder mounted on said casing frame for rotatably holding a roll of recording paper wound about a core;

ink ribbon holding means mounted on said casing frame for holding an ink ribbon feeding roll and an ink ribbon take-up roll both of which are adapted to wind a supply of ink ribbon thereabout;

a platen roller mounted on said cover frame for bringing both said recording paper and said ink ribbon in pressure contact with said thermal head;

a cutter mounted on said cover frame for cutting a part of said recording paper;

recording paper guide means for guiding said recording paper between said thermal head and said platen roller to said cutter after said recording paper is unwound from said roll of recording paper; and ink ribbon guide means for guiding said ink ribbon between said thermal head and said platen roller to said ink ribbon take-up roll after said ink ribbon is unwound from the said ink ribbon feeding roll.

2. The thermal transfer recording apparatus as defined in claim 1, wherein said cover frame is turnably connected to said casing frame.

3. The thermal transfer recording apparatus as defined in claim 2, wherein said recording paper guide means includes:

a pivot shaft turnably connected to said casing frame;

a recording paper guide plate fixed to said pivot shaft and positioned to cover said ink ribbon feeding roll when said cover frame is closed; and means for linking said recording paper guide plate to said cover frame so that said recording paper guide plate moves away from said ink ribbon feeding roll as said cover frame is opened.

4. The thermal transfer recording apparatus as defined in claim 3, wherein said recording paper guide means further includes a pin extending from said pivot shaft fixed to said recording paper guide plate and said linking means includes:

a first lever having a connected end turnably connected to said cover frame, said first lever being displaceably fitted onto a guide shaft extending across said casing frame to define the extent of turning movement of said cover frame;

a second lever turnably connected to said casing frame and having a free end displaceably holding said pin extending from said pivot shaft of said recording paper guide means so that displacement of said free end of said second lever displaces said pin and turns said pivot shaft and said recording paper guide plate relative to said frame means; and spring means for resiliently connecting said second lever to the end of said first lever opposite said connected end.

5. The thermal transfer recording apparatus as defined in claim 1, wherein said cover frame includes a guide bar adapted to contact said ink ribbon extended between said ink ribbon feeding roll and said ink ribbon take-up roll when said cover frame covers said casing frame.

6. The thermal transfer recording apparatus as defined in claim 1, wherein said ink ribbon guide means includes an ink ribbon cassette rotatably supported therein, said ink ribbon feeding roll and said ink ribbon take-up roll being rotatably mounted in said ink ribbon cassette.

7. A thermal transfer recording apparatus, comprising:

a casing frame having an opposing pair of frame members;

a thermal head;

a recording paper holder for rotatably holding a roll of recording paper wound about a core;

ink ribbon holding means for holding a pair of ink ribbon rolls both of which are adapted to wind a supply of ink ribbon thereabout, said ink ribbon holding means including a pair of first shafts supported on one of said opposing pair of frame members and a pair of second shafts supported on the other of said opposing pair of frame members, a plurality of reels each rotatably held on one of said shafts and adapted to support one end of one of said ink ribbon rolls, and spring means disposed on each of said shafts between said frame members and said reels for applying a force to clamp each of said ink ribbon rolls rotatably supported between opposing pair of reels respectively;

a platen roller for bringing both said recording paper and said ink ribbon in pressure contact with said thermal head;

a cutter for cutting a part of said recording paper;

recording paper guide means for guiding said recording paper between said thermal head and said platen roller to said cutter after said recording paper is unwound from said roll of recording paper; and ink ribbon guide means for guiding said ink ribbon between said thermal head and said platen roller to one of said ink ribbon rolls after said ink ribbon is unwound from the other of said ink ribbon rolls.

8. The thermal transfer recording apparatus as defined in claim 7, wherein said ink ribbon holding means includes:

a pair of reel sprockets, each mounted on one of said first shafts;

a drive sprocket; and an endless chain extended around said reel sprockets and driven by said drive sprocket.

9. The thermal transfer recording apparatus as defined in claim 8, wherein said ink ribbon holding means further includes:

a pair of joint members, each rotatably mounted on one of said first shafts and adapted to come in frictional contact with said reel mounted on said corresponding first shaft; and a pair of one-way clutches each interposed between one of said joint members and said reel sprocket mounted on said corresponding first shaft, said pair of one-way clutches locking the rotation of said reels mounted on said first shafts in mutually opposite directions.

10. The thermal transfer recording apparatus as defined in claim 8, wherein said first shafts are rotatably supported on said one frame member, and said ink ribbon holding means further includes:

a pair of joint members, each axially movably mounted on one of said first shafts and in frictional contact with said reel mounted on said corresponding first shaft;

a pair of first one-way clutches each interposed between one of said first shafts and said reel sprocket mounted on said corresponding first shaft; and a pair of second one-way clutches each interposed between one of said first shafts and said one frame member to lock the rotation of said reels mounted on said first shafts in mutually opposite directions.

11. The thermal transfer recording apparatus as defined in claim 8, wherein said driving sprocket is fixedly connected to said platen roller.

12. The thermal transfer recording apparatus as defined in claim 1, wherein said recording paper guide means includes means for detecting whether recording paper is supplied in said recording paper guide means.

13. The thermal transfer recording apparatus as defined in claim 1, further comprising a plurality of guide bars extended across said frame means at positions located upstream and downstream of said platen roller to guide the movement of said ink ribbon and said recording paper.

14. The thermal transfer recording apparatus as defined in claim 1, further comprising:

a guide bar extended across said frame means at a position located downstream of said platen roller to guide the movement of said ink ribbon and said recording paper; and a guide plate extended between said guide bar and said thermal head.

* * * * *